United States Patent [19]

Harris et al.

[11] Patent Number: 4,491,498

[45] Date of Patent: Jan. 1, 1985

[54] METHOD OF AND APPARATUS FOR APPLYING A LAMINATED PRESSURE-SENSITIVE ADHESIVE STRIP CONSTRUCTION TO A FLEXIBLE SHEET

[75] Inventors: Ronald R. Harris; Herbert M. Saunders, both of Newark, Ohio

[73] Assignee: Owens-Corning Fiberglas Corporation, Toledo, Ohio

[21] Appl. No.: 364,558

[22] Filed: Apr. 1, 1982

[51] Int. Cl.³ .................. B31F 5/00; B32B 31/00; B32B 31/04
[52] U.S. Cl. .................. 156/497; 156/249; 156/344; 156/554; 156/584
[58] Field of Search ............... 156/540, 541, 542, 230, 156/238, 344, 247, 249, 285, 289, 444, 497, 584, 215, 554, 522; 118/62, 63, 68, 325, 44, 315; 493/450, 461; 15/415 R

[56] References Cited

U.S. PATENT DOCUMENTS

| | | | |
|---|---|---|---|
| 2,717,848 | 9/1955 | Jaye | 156/289 |
| 2,890,739 | 6/1956 | Haines, Jr. | 156/215 |
| 3,736,902 | 6/1973 | Glanzer | 118/325 |
| 3,769,147 | 10/1973 | Komendat et al. | 156/249 |
| 3,978,695 | 9/1976 | Hürzeler et al. | 118/325 |
| 3,981,085 | 9/1976 | Franko | 118/62 |
| 4,022,248 | 5/1977 | Hepner et al. | 428/40 |
| 4,113,538 | 9/1978 | Green | 156/584 |
| 4,157,410 | 6/1979 | McClintock | 428/40 |
| 4,344,382 | 8/1982 | Haüsler et al. | 118/325 |

OTHER PUBLICATIONS

Nufer, IBM Technical Disclosure Bulletin, vol. 16, No. 9, Feb. 1974, p. 2892.

Primary Examiner—Michael Wityshyn
Assistant Examiner—Louis Falasco
Attorney, Agent, or Firm—Ronald C. Hudgens; P. R. Cloutier; Paul J. Rose

[57] ABSTRACT

Air nozzle assemblies are provided for stripping the release strips from a laminated pressure-sensitive adhesive strip construction applied to a jacket for pipe insulation.

4 Claims, 7 Drawing Figures

METHOD OF AND APPARATUS FOR APPLYING A LAMINATED PRESSURE-SENSITIVE ADHESIVE STRIP CONSTRUCTION TO A FLEXIBLE SHEET

TECHNICAL FIELD

This invention relates generally to a flexible sheet having two strips of pressure-sensitive adhesive respectively on different portions thereof, the sheet being manipulated to place the strips of adhesive in contact with each other in the use of a product, such as pipe insulation, for example. More particularly, the invention relates to apparatus for stripping protective layers from a laminated pressure-sensitive adhesive strip construction and adhering the remainder of the strip construction to an edge of a flexible sheet.

BACKGROUND ART

U.S. Pat. No. 2,717,848 discloses two semicylindrical pieces of pipe insulation with pressure-sensitive adhesive on mating surfaces initially separated by wax paper.

U.S. Pat. No. 2,890,739 discloses pipe insulation wherein two strips of adhesive are provided on the jacket for good sealing when the adhesive strips are joined. The adhesive in this patent is not of the pressure-sensitive or self-sealing type.

U.S. Pat. No. 4,022,248 discloses a jacket for pipe insulation, with two cooperable strips of pressure-sensitive or self-sealing adhesive each initially protected by a strip of release paper or film.

U.S. Pat. No. 4,157,410 discloses two embodiments of a laminated pressure-sensitive adhesive strip construction principally for use on pipe insulation.

DISCLOSURE OF INVENTION

In accordance with the invention, apparatus is disclosed for applying a laminated pressure-sensitive adhesive strip construction different from those disclosed in U.S. Pat. No. 4,157,410 to a flexible sheet such as a jacket for pipe insulation, after first stripping off the protective strips of release paper or film.

BRIEF DESCRIPTION OF DRAWINGS

The invention is more particularly described hereinafter with reference to the accompanying drawings in which.

BEST MODE OF CARRYING OUT THE INVENTION

Figure 1:
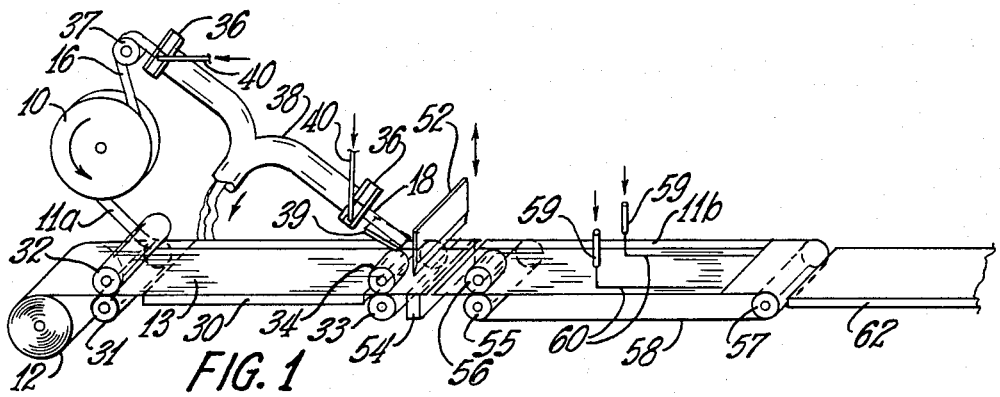
FIG. 1 is a schematic perspective view of apparatus constructed in accordance with the invention for applying a laminated pressure-sensitive adhesive strip construction to a flexible sheet such as a jacket for pipe insulation.
Figure 5:
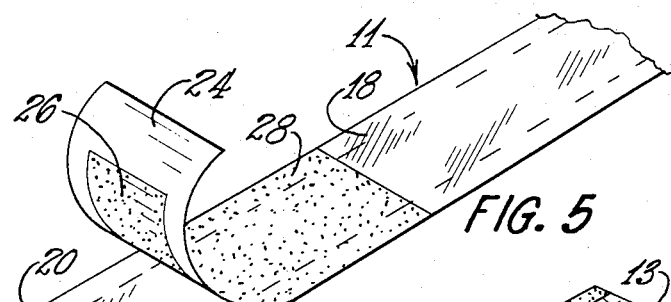
FIG. 5 is a fragmentary perspective view illustrating the laminated pressure-sensitive adhesive strip construction used with the apparatus of FIG. 1.

With reference to the drawings, FIG. 1 shows a suitably mounted reel 10 of a laminated pressure-sensitive adhesive strip construction 11 and a roll 12 of a flexible jacket material 13 for pipe insulation. The adhesive strip construction 11 is best shown in FIG. 5 and includes a first outer release strip 16 on one side and a second outer release strip 18 on the other side. The release strips 16 and 18 may be made of paper or of plastic film such as polyethylene, polypropylene, polyester, polyvinyl, or polyethyleneterephthalate, and are coated on their inner sides with a release coating such as silicone. The release strips 16 and 18 are removed in a pipe insulation factory by the apparatus of this invention and may therefore be referred to as "factory" release strips. The adhesive strip construction 11 without the release strip 16 is identified in FIG. 1 by the indicium 11a, and further by the indicium 11b without the release strip 18.

An inner release strip 20, with release coatings on opposite sides, is provided between the outer release strips 16 and 18. A pressure-sensitive adhesive layer 22 is provided between the outer release strip 16 and the inner release strip 20. A carrier strip 24 is provided between the outer release strip 18 and the inner release strip 20. The carrier strip 24 is preferably made of thin porous paper generally of the type used to make tea bags, and is provided on opposite sides respectively with pressure-sensitive adhesive layers 26 and 28. The adhesive layers 22 and 26 are of equal, relatively narrow widths, and the adhesive layer 28, the carrier strip 24, and the release strips 16, 18, and 20 are of equal, relatively wide widths. The narrow adhesive layer 26 is adjacent the inner release strip 20 and the wide adhesive layer 28 is adjacent the outer release strip 18.

The jacket material 13 is preferably a conventional lamination of kraft paper and aluminum foil with glass scrim reinforcement therebetween. As unrolled from the roll 12 in FIG. 1, the aluminum foil side of the jacket material 13 is facing up, the kraft paper side down. The jacket material 13 is pulled from the roll 12 and fed horizontally over a support member 30 by any suitable means, such as two pairs of rotatably driven pull rolls. In FIG. 1, one pair of pull rolls 31 and 32 is shown between the roll 12 and the support member 30. Another pair of pull rolls 33 and 34 is shown adjacent a downstream end of the support member 30, the pull roll 34 being shortened to avoid the adhesive strip construction 11b with its exposed adhesive 28.

Figure 2:
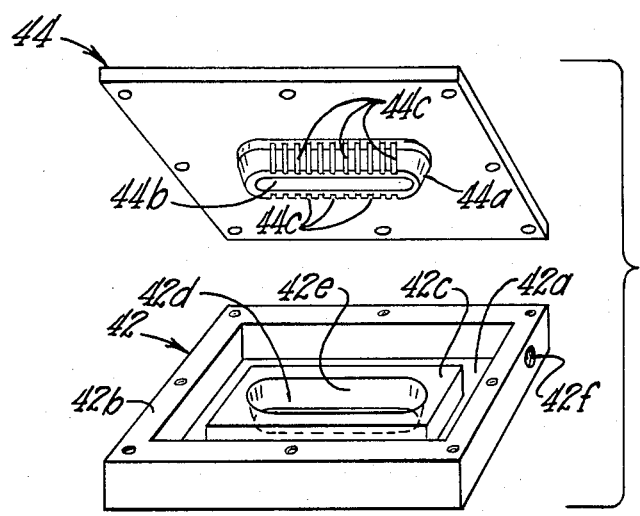
FIG. 2 is an exploded perspective view showing two parts of one of the two stripping nozzle assemblies of the apparatus of FIG. 1.
Figure 3:
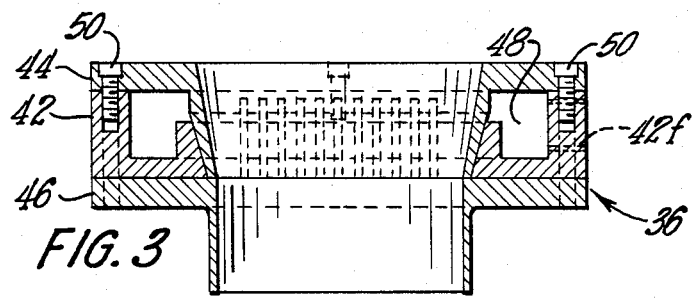
FIG. 3 is a longitudinal sectional view through one of the stripping nozzle assemblies.
Figure 4:
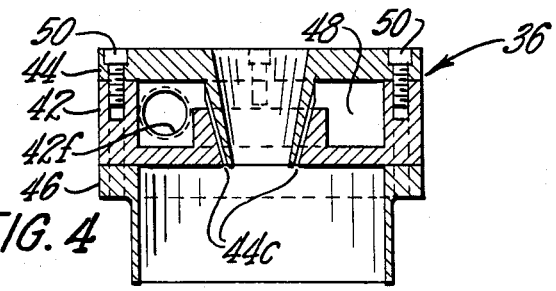
FIG. 4 is a transverse sectional view through one of the stripping nozzle assemblies.

In accordance with the invention, two air nozzle assemblies 36 are mounted respectively at the outer ends of the two arms of a generally Y-shaped conduit 38. Each nozzle assembly is connected to an air supply tube 40. As best shown in FIGS. 2–4, each air nozzle assembly 36 includes a generally flat rectangular body 42, a matching cover 44 on one side of the body 42, and a matching connector 46 on the other side of the body 42. An inner surface of the cover is provided with a central projection 44a transversely elongated in the direction of the longer dimension of the cover. A central slot 44b for receiving one of the release strips 16 and 18 extends through the cover inclusive of the projection. Both the outer surface of the projection 44a and the inner surface thereof defining the slot are convergent in a direction toward the connector 46. The outer surface of the projection 44a is provided respectively along opposite portions thereof defining the flat sides of the slot 44b with a plurality of spaced, straight, parallel grooves 44c extending toward the body 42.

The body 42 includes a flat rectangular base portion 42a with a perpendicularly projecting sidewall portion 42b extending around all four sides and a central rectangular projection 42c spaced inwardly from and projecting less than the sidewall portion 42b. The base portion 42a and the projection 42c are provided with a central oblong opening 42d in which the projection 44a on the cover is received. A surface 42e defining the opening 42d converges toward the connector 46 at the same angle as the outer surface of the projection 44a and forms a seat therefor, the projection 44a being in engagement with the seat 42e and the cover 44 being in engagement with the sidewall portion 42b. An air passageway 48 is thus provided in surrounding relationship to the portion of the projection 44a immediately adjacent the inner surface of the cover 44 and not in engagement with the seat 42c. A threaded aperture 42f is provided in the body 42 for connection of the respective air supply tube 40. The cover 44 is secured to the sidewall portion 42b by four relatively short screws 50 disposed midway along the side edges of the body 42 and the cover 44. Four relatively long screws (not shown) disposed at the corners of the body 42, cover 44, and connector 46 secure all three pieces together. As best seen in FIG. 4, the grooves 44c and the seat 42e form converging air passageways from the passageway 48 into the connector 46, which in turn leads into the conduit 38. Air flowing through the grooves 44c exerts a force on the respective release strip 16 or 18 strong enough to keep pulling more of the release strip from the remainder of the adhesive strip construction 11 and feed the freed release strip through the conduit 38 to a place of disposal. In FIG. 1, the release strip 16 is pneumatically pulled off first by the respective nozzle assembly 36 and fed to the conduit 38 after passing over a roll 37, leaving the adhesive layer 22 exposed and facing downwardly where the adhesive strip construction 11a, without the release strip 16, joins the jacket material 13. In the passing of the jacket material 13 and the adhesive strip construction 11a between the pull rolls 31 and 32, the adhesive layer 22 becomes firmly adhered to an edge portion of the jacket material 13. Just before the jacket material 13 passes between the pull rolls 33 and 34, the release strip 18 is pneumatically pulled off by the respective nozzle assembly 36 and fed to the conduit 38 after passing over a guide plate 39, leaving the adhesive layer 28 exposed. The guide plate 39 prevents the release strip 18 from being pulled off farther upstream and thus maintains the freed strip in proper alignment for entry into the respective nozzle assembly 36. After passing the pull rolls 33 and 34, the jacket material 13, inclusive of the adhesive strip construction 11b, is chopped to a desired length, which might be, for example, three or four feet, by a chopping blade 52 reciprocable toward and away from a back-up bar 54. The cut length of jacket material passes through a pair of pull rolls 55 and 56, the roll 56 being shorter to avoid contact with the exposed adhesive layer 28. The pull roll 55 is part of an endless belt conveyor system including a roll 57 and an endless belt 58. As the cut length of jacket material 13 passes under a pair of spaced nozzles 59, a pair of glue strips 60 is deposited thereon. As will be understood by those skilled in the art, the nozzles 59 are activated and deactivated by sensors respectively sensing the leading and trailing edges of the moving cut length of jacket material 13. The cut length is delivered to a worktable 62.

Figure 6:
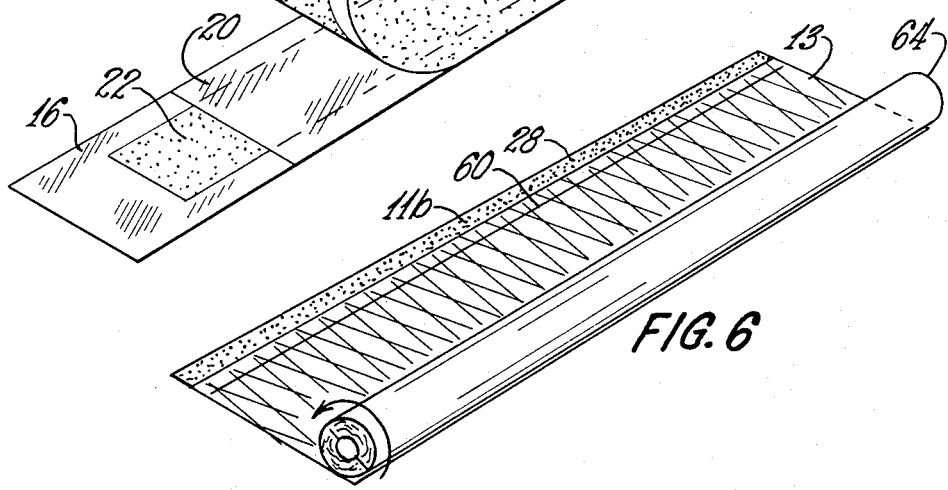
FIG. 6 is a perspective view of a length of flexible jacket material and a matching length of pipe insulation material about to be rolled up in the jacket.
Figure 7:
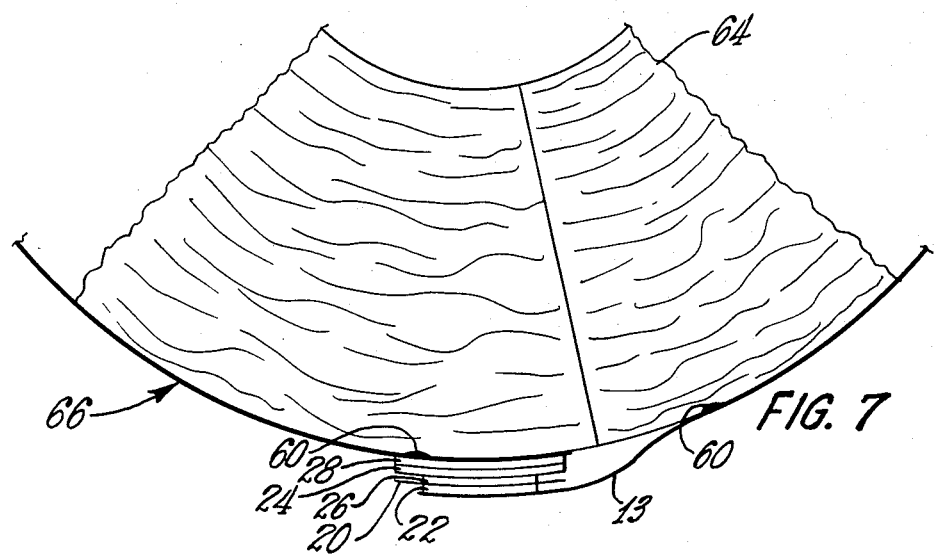
FIG. 7 is a schematic end view of a length of completed pipe insulation in condition for shipping, with exaggerated thicknesses for the laminated adhesive strip construction.

At the worktable 62, a workman is provided with a supply of previously formed pieces of pipe insulation. FIG. 6 illustrates such a piece of pipe insulation 64 and shows how it is placed on a cut length of jacket material 13. It is then rolled up in the jacket material 13. FIG. 7 shows an end view of a pipe insulation product 66 ready for shipment, thicknesses at the adhesive joint being exaggerated. It will be noted in FIG. 6 that the adhesive strip construction 11b with the layer 28 of adhesive exposed is disposed along an inner surface of one longitudinal edge portion of the jacket material 13, and in FIG. 7 that the layer 28 of adhesive becomes attached to an outer surface of the other longitudinal edge portion of the jacket material 13. Further, the jacket material 13 becomes attached to the insulation 64 at the glue strips 60.

The release strip 20 is a "field" release strip. When the pipe insulation product 66 is to be used, the release strip 20 is pulled to separate the adhesive joint and is completely removed before the insulation is placed over a pipe and the adhesive layers 22 and 26 are pressed together to form a strong bond.

Various modifications may be made in the structure shown and described without departing from the scope of the invention.

We claim:

1. Apparatus for applying a laminated pressure-sensitive adhesive strip construction to flexible sheet material comprising:
   (a) means for feeding flexible sheet material from a supply roll along a predetermined path,
   (b) first nozzle means for pneumatically stripping a first release strip from a laminated pressure-sensitive adhesive strip construction on a supply reel to expose a first pressure-sensitive adhesive layer, said first nozzle means including a nozzle assembly having a central slot through which the first release strip passes and having convergent passageways for directing compressed air angularly respectively toward opposite sides of an already stripped-away portion of the first release strip and generally in the direction of travel of the first release strip through the central slot to thereby pull additional first release strip from the adhesive strip construction on the supply reel as the adhesive strip construction without the first release strip is being pulled from the supply reel, and
   (c) means for feeding the laminated pressure-sensitive adhesive strip construction, without the first release strip, from the supply reel to the flexible sheet material and progressively adhering it thereto by the exposed first pressure-sensitive adhesive layer as the flexible sheet material is being fed along the predetermined path.

2. Apparatus as claimed in claim 1 including second nozzle means for pneumatically stripping a second release strip from the laminated pressure-sensitive adhesive strip construction on the flexible sheet material to expose a second pressure-sensitive adhesive layer, said second nozzle means including a nozzle assembly having a central slot through which the second release strip passes and having convergent passageways for directing compressed air angularly respectively toward opposite sides of an already stripped-away portion of the second release strip and generally in the direction of travel of the second release strip through the central slot of the second nozzle means to thereby pull additional second release strip from the adhesive strip construction on the flexible sheet material as the flexible sheet material with the adhesive strip construction thereon is being fed along the predetermined path.

3. Apparatus for applying a laminated pressure-sensitive adhesive strip construction to flexible sheet material comprising:
  (a) means for feeding flexible sheet material from a supply roll along a predetermined path,
  (b) first nozzle means for pneumatically stripping a first release strip from a laminated pressure-sensitive adhesive strip construction on a supply reel to expose a first pressure-sensitive adhesive layer, said first nozzle means having a central slot for passage of the first release strip therethrough,
  (c) means for feeding the laminated pressure-sensitive adhesive strip construction, without the first release strip, from the supply reel to the flexible sheet material and adhering it thereto by the exposed first pressure-sensitive adhesive layer, and
  (d) second nozzle means for pneumatically stripping a second release strip from the laminated pressure-sensitive adhesive strip construction on the flexible sheet material to expose a second pressure-sensitive adhesive layer, said second nozzle means having a central slot for passage of the second release strip therethrough.

4. A nozzle assembly for pneumatically stripping a release strip from a laminated pressure-sensitive adhesive strip construction, the nozzle assembly comprising a generally flat elongated rectangular body and a generally flat elongated rectangular cover, the cover having a central projection extending from an inner surface, the projection being transversely elongated in the direction of a longer dimension of the cover and having a plurality of spaced straight parallel grooves respectively on opposite longer outer surfaces thereof, the grooves extending generally in the direction the projection extends from the cover, the cover and the projection having a slot therethrough for receiving the release strip, the body including a generally flat rectangular base portion having a sidewall portion projecting from an inner surface along four side edge portions thereof and having a central rectangular projection spaced inwardly from and projecting from the inner surface less than the sidewall portion, the base portion and the central projection thereon being provided with a central oblong opening defined by an inner surface in cooperative engagement with the central projection on the cover, the inner surface of the cover being engaged with the sidewall portion of the body such that an air passageway is provided around the central projection of the cover adjacent the inner surface thereof and the grooves in said projection form outlets from said passageway, and the sidewall portion of the body having an opening for connecting an air supply tube to said passageway.

* * * * *